United States Patent Office 3,169,841
Patented Feb. 16, 1965

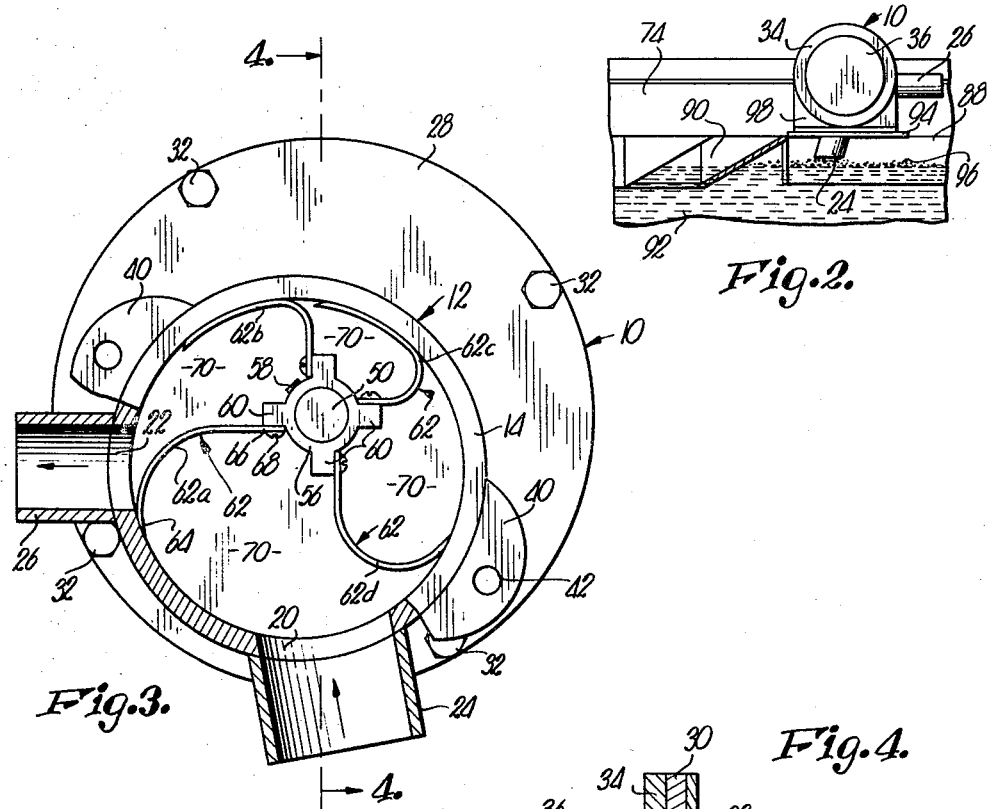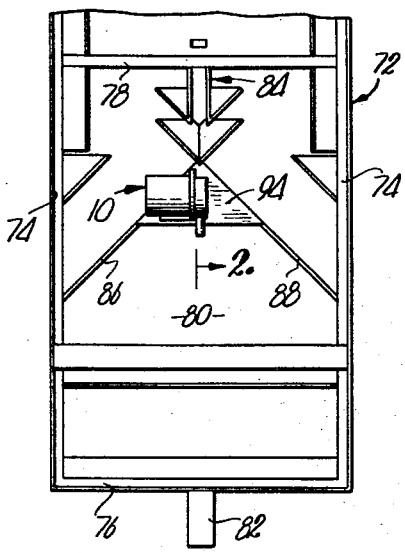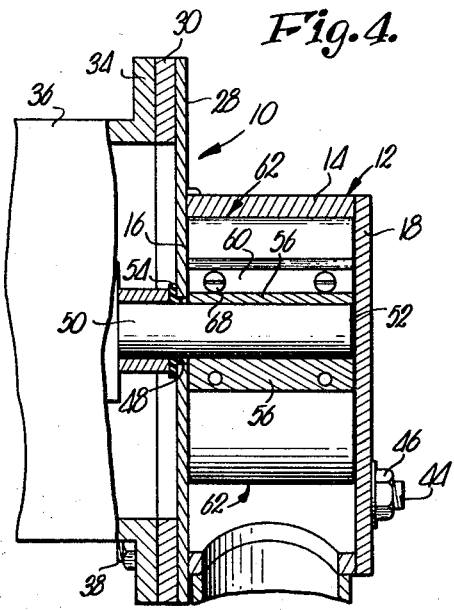

3,169,841
METHOD FOR ELIMINATING FOAM FROM
SEWAGE TREATMENT EQUIPMENT
Frank G. Weis, Kansas City, Mo., assignor to Union Tank
Car Company, Chicago, Ill., a corporation of New
Jersey
Filed Sept. 18, 1961, Ser. No. 138,965
5 Claims. (Cl. 55—36)

This invention relates to a sewage treatment method and more particularly, to a novel method for removing and collapsing detergent foam which forms on the surface of sewage within a disposal tank while the sewage is undergoing treatment prior to discharge of the effluent into a stream or the like.

A common problem associated with sewage treatment apparatus is the accumulation of detergent foam on the top of sewage while the latter is within a disposal tank and undergoing treatment to effect conversion of the solids in the sewage either into water soluble form or very fine suspended particles which are discharged with the effluent from the tank into a stream or other suitable removal medium. Since detergent foam, when discharged into a stream or river, has deleterious effects on the plant and animal life in and around the stream or river, as well as evoking complaints from individuals who use the river or land adjacent thereto, it has been found to be desirable to collapse the detergent foam so that the same is not discharged with the effluent from the sewage disposal tank into a stream. Furthermore, it is objectionable from the standpoint of operation of the disposal unit, to have detergent foam accumulate on the top of the sewage while the same is undergoing treatment. The foam tends to pile up in the aeration basin of the sewage disposal unit and currents of air passing across the disposal tank tend to blow the foam onto the surrounding area, thereby leaving a greasy film on everything which the foam contacts. The foam also causes undesirable materials to collect on the exposed surfaces of the tank which are contacted by the foam during accumulation thereof on the sewage in the disposal unit.

In view of the fact that detergents are becoming a very acute problem when discharged into streams that ultimately serve as sources of water supply for communities downstream from the disposal plant, it has also been found important to provide means of not only collapsing the bubbles presenting the detergent foam on top of the liquid in a sewage disposal plant, but also permitting separation of the detergent from the sewage for delivery to a suitable collection vessel where the detergent may be treated in a manner to permit safe discharge of the same into a stream, or actually prevent it from passing into the stream during operation of the disposal apparatus.

Detergent foam is a particular problem in sewage treatment processes wherein the sewage is subjected to an aeration step where large quantities of air are directed into the sewage causing the latter to move in a circulatory manner for maximum contact of the solid materials in the sewage with the air diffused thereinto. Because of the extreme agitation of the sewage in the aeration basin, the detergent in the sewage foams in a manner to present a thick layer of bubbles on the top of the liquid in the aeration basin of the sewage treatment equipment permitting the foam to be blown out of the tank by currents of air passing across the sewage treatment apparatus as previously discussed. The odorous greasy residues left by the detergent foam on the treatment equipment and surrounding landscape is very undesirable and has led to numerous attempts to preclude accumulation of foam on the top of the liquid in the sewage treatment equipment.

Past attempts to reduce the amount of detergent foam on the surface of the liquid in the treatment plants have primarily involved utilization of water sprays which are directed downwardly against the upper surface of the sewage in the treatment tank to thereby prevent accumulation of foam in the tank and particularly within the aeration basin thereof. The water sprays require relatively high velocity streams of water which impinge upon the foam in order to effectively penetrate the individual bubbles of the foam blanket to thereby effect collapsing of the same. Although the water sprays have been satisfactory to a degree, limitations have been found to exist inasmuch as costly and bulky equipment is required to effectively repress formation of detergent foam on the top of the liquid in the treatment apparatus, and it has been necessary to increase the overall size of the sewage disposal tanks to cope with the problem. Furthermore, a clean water source must be provided for the water spray units to prevent clogging of the spray nozzles. Clean water is normally not readily available in the areas where sewage treatment tanks are located, and considerable power is required to operate the pumps for forcing water downwardly onto the upper surface of the liquid in the sewage treatment tank to cause the bubbles presenting the foam to collapse and thereby avoid accumulation of foam in the disposal unit. In view of these limitations, the spray method of eliminating detergent foam from the surface of the liquid in a sewage treatment tank, has proven unsatisfactory and a need for a more economical and positive method of collapsing the foam at the top of the tank, and if desired providing removal of the detergent from the tank, has been generally recognized.

The present invention provides a novel method for collapsing detergent foam which tends to collect at the upper surface of the liquid within a sewage treatment tank and for delivering the fluid remaining from such collapsing of the foam, to a point of discharge, or back into the tank if desired. The method of the present invention is accomplished through provision of a fluid pump adapted to confine the bubbles presenting the detergent foam in an enclosed region and subsequently compressing the bubbles sufficiently to effect collapse thereof, whereby liquid is discharged from the pump for conveyance to a point of collection or returned to the tank as desired.

The solids and liquid handling fluid pump which forms the subject of the instant invention comprises a housing presenting an enclosed space and having a cylindrical side wall provided with inlet and outlet openings therein. A pair of opposed end walls close the cylindrical side wall, and a rotatable shaft is mounted within one of the end walls for rotation relative thereto with the shaft being disposed in eccentric relationship with respect to the side walls. A plurality of flexible, sheet-like elements are secured to the shaft for rotation therewith about the axis of the shaft so that the flexible elements, which substantially span the distance between the shaft and the side wall, divide the space within the pump into a number of fluid-receiving, collapsible chambers successively alignable with the inlet and outlet openings. As the bubbles defining the foam are drawn into the chamber aligned with the inlet opening, the elements defining the respective chamber assume different configurations under the action of the rotating shaft to thereby decrease the area of the chamber referred to and thus placing sufficient pressure on the bubbles to cause the same to collapse. The fluid resulting from the collapsed bubbles is then discharged from the pump housing through the outlet for displacement either back into the sewage in the tank, or into a suitable collection receptacle.

It is therefore, the primary object of the present invention to provide a method of collapsing detergent foam which collects on the upper surface of the liquid in a sewage treatment tank and with collapsing of the foam bubbles being effected by increasing the pressure on such bubbles until the same collapse prior to the liquid produced therefrom being discharged from the pump.

Another object of the present invention is the provision of a method for preventing accumulation of detergent foam on the upper surface of the liquid in a sewage treatment tank and including a pump having a housing defining an enclosed space, and flexible, sheet-like elements therein secured to a rotatable member extending into the housing, the flexible elements dividing the enclosed space into a number of fluid-receiving, collapsible chambers whereby foam directed into the chambers through an inlet opening in the housing is directed toward an outlet opening in the pump housing while the chambers are cause to collapse and thereby place sufficient pressure on the bubbles of the foam to effect collapse of such bubbles whereby the liquid and gas produced therefrom are conveyed toward the outlet opening for discharge therefrom.

A particularly important object of the invention is the provision of a fluid pump for collapsing the bubbles associated with detergent foam on the upper surface of the liquid in a sewage disposal tank wherein the pump chamber defining elements within the pump housing are of flexible construction so that solids may be conveyed through the pump without in any way affecting the operation thereof, or requiring disassembly of the pump for frequent cleaning and replacement of parts.

A still further important aim of the invention is to provide a method for collapsing the bubbles of detergent foam which collect on the top of a sewage treatment tank, wherein very little power is required to operate the pump which effects collapsing of the bubbles by virtue of the fact that flexible vane elements are employed in the pump which clear solid objects which find their way into the pump and thus negates the necessity of employing a relatively powerful pump unit which would necessarily be of a size to positively dislodge solid materials from the pump unit during operation thereof. In the present pump unit, the flexible vane elements give sufficiently to clear any solid materials in the pump and are ultimately discharged from the pump by virtue of continued engagement of the vane-like elements with the solids as the vanes are caused to rotate under the action of the prime mover driving the pump.

Other objects of the present invention will become apparent as the following specification progresses, reference being had to the accompanying drawing, wherein:

FIGURE 1 is a fragmentary, plan view of a sewage disposal tank and illustrating a pump unit embodying the preferred concepts of the present invention mounted on the tank in a position to receive detergent foam accumulated on the top of the liquid in the tank to effect collapse of such foam;

FIG. 2 is an enlarged, fragmentary, vertical sectional view taken substantially on the line 2—2 of FIG. 1;

FIG. 3 is an enlarged, end elevational view of a pump unit constructed in accordance with the principles of the present invention, parts of the pump unit being broken away and in section to illustrate details thereof; and FIG. 4 is a fragmentary, vertical, cross-sectional view taken substantially on the line 4—4 of FIG. 3.

The method for collapsing detergent foam which accumulates on the top of a sewage disposal tank is best shown in FIGS. 3 and 4 of the drawings and is broadly denoted by the numeral 10. The pump apparatus 10 includes a housing broadly designated 12 and which is provided with a cylindrical side wall 14 and a pair of opposed end walls 16 and 18 closing the ends of side wall 14. As is best apparent from FIG. 3, side wall 14 is provided with spaced openings 20 and 22 therein at circumferentially spaced points thereon for defining an inlet and an outlet respectively. Tubular stretches 24 and 26 secured to side wall 14 in register with openings 20 and 22 respectively, project outwardly from the outer surface of side wall 14 and provide means for directing foam into the interior of housing 12 and for discharging liquid therefrom.

End wall 16 comprises a circular disc 28 of a diameter substantially greater than the diameter of side wall 14. Disc 28 is secured to a support 30 in the nature of an annular ring for mounting housing 12 in a position with the axis of revolution of side wall 14 in a substantially horizontal position. A plurality of stud bolts 32 arranged adjacent the periphery of disc 28 pass through, and are threadably received in aligned openings (not shown) in support 30 for securing disc 28 and thereby housing 12 to support 30. The annular flange 34 of a motor housing 36 is secured to support 30 with bolts 38 being employed to couple flange 34 to support 30.

End wall 18 is provided with a pair of diametrically opposed ears 40 thereon which project in opposite directions from the outer surface of side wall 14. The diameter of end wall 18 is substantially equal to the diameter of side wall 14 so that end wall 18 completely covers the proximal end of side wall 14. Each ear 40 is provided with an opening 42 therein for receiving a bolt 44 having a head countersunk in disc 28. Nut 46 threadably secured to the outermost end of each bolt 44 serves to couple end wall 18 to side wall 14. By virtue of the described construction, end wall 16 is pressed against side wall 14, but it is clear that side wall 14 may be secured in any suitable manner to end wall 16.

As shown in FIG. 4, end wall 16 is provided with an opening 48 therein concentric with the axis of revolution of disc 28. Side wall 14 is secured to end wall 16 and thereby disc 28 at a location so that the opening 48 is spaced from the axis of revolution of side wall 14. Opening 48 clears an elongated drive shaft 50 which is operably coupled to the electric motor within motor housing 36. The outermost end 52 of shaft 50 terminates within housing 12 adjacent the inner surface of end wall 18 and is substantially out of contact with the proximal portion of end wall 16. Sealing means 54 in the nature of a rubber washer, surrounds shaft 50 and covers the remaining open portions of opening 48 to thereby seal the interconnection between the latter and shaft 50. It is to be noted that shaft 50 is spaced from the axis of revolution of side wall 14 and thereby, is eccentric relative to the latter.

A collar 56 is mounted on shaft 50 within housing 12 between end walls 16 and 18. Collar 56 substantially spans the distance between end walls 16 and 18 and is rigid to the shaft 50 for rotation therewith by virtue of a setscrew 58 threadably received within collar 56 and normally bearing against shaft 50.

Collar 56 is provided with a plurality of circumferentially spaced, radially projecting lugs 60 thereon which rotate with collar 56 and shaft 50. A flexible, sheet-like element 62 is secured to each lug 60 and extends outwardly from the latter. Each element 62 is formed from a sheet of yieldable material such as rubber or the like, and is provided with a pair of opposed end marginal edges 64 and 66, the latter being secured to the respective lug by screws 68 threadably received in the lug 60. The side marginal edges of each element 62 substantially span the distance between end walls 16 and 18 and element 62, thereby dividing the space formed by side wall 14 and end walls 16 and 18 into a number of fluid-receiving chambers 70 which are alignable successively with openings 20 and 22.

It is to be noted that the marginal edge 64 of each element 62, engages the inner surface of side wall 14 at all times during rotation of shaft 50 and, due to the eccentric mounting of shaft 50 within housing 12, a greater or lesser portion of the proximal surface of each element 62, engages the inner surface of side wall 14 depending upon the location of the element 62 relative to openings 20 and 22. As illustrated in FIG. 3, element 62a is provided with a marginal edge 64 which engages the inner surface of side wall 14 adjacent opening 22. The element 62b adjacent element 62a, has a greater portion of the proximal surface thereof in engagement with the inner surface of side wall 14 by virtue of the eccentric mounting of shaft 50. Similarly, element 62c has a considerable portion thereof in engagement with the inner surface of side wall 14 and the element 62d is, like element 62a, provided with only a small portion thereof in engagement with side wall 14. It is clear that the chamber 70 between elements 62a and 62d is of a relatively large volume, and the chamber 70 between elements 62b and 62c is of a relatively small volume. The chambers 70 between elements 62a and 62b and between elements 62c and 62d have volumes smaller than the volume between elements 62a and 62d, but greater than the volume of chamber 70 between elements 62b and 62c. As shaft 50 rotates in a clockwise direction when viewing FIG. 2, the elements 62 assume the various configurations shown in FIG. 3 to thereby alternately increase and decrease the chambers 70 formed thereby. It is clear, therefore, that as chamber 70 between elements 62a and 62d moves toward opening 22 from opening 20, that the chamber 70 is caused to increase in volume drawing in foam and then reduces in volume compressing the foam carried thereby toward opening 22.

In operation, apparatus 10 is adapted to be utilized on a sewage disposal tank broadly designated 72 and having a pair of side walls 74 cooperating with the end wall 76 and an inclined divider partition 78 between side walls 74, to present an aeration basin 80. Sewage to be treated is directed into the basin 80 through the inlet structure 82 while structure not shown is provided for directing air into the sewage in basin 80 for diffusion into the liquid contained in the aeration basin. Buoyant particle return structure broadly designated 84 and forming no part of the present invention, is positioned within basin 80 and mounted on partition 78.

A pair of angularly disposed, relatively flat rods 86 and 88 mounted within basin 80, secured to side walls 74 and coupled to the outer end of structure 84 remote from partition 78, converge as structure 84 is approached and are positioned so that the lower margins thereof are located below the level 90 of the sewage 92 within basin 80. A triangular plate 94, secured to the upper edges of rods 86 and 88 and positioned at the apex of rods 86 and 88 adjacent structure 84, serves as means for mounting the pump apparatus 10 as is shown in FIGS. 1 and 2. The tubular stretch 24 extends downwardly through plate 94 as shown in FIG. 2 and terminates in slightly spaced relationship to the upper level 90 of liquid sewage 92. In this manner, the foam 96 will be drawn into the chamber 70 aligned with opening 20 and liquid sewage will not be pulled into the pump unit during operation of the latter. The bracket structure 98 serves to secure motor housing 36 to plate 94 and the stretch 26 extends outwardly beyond the edge of plate 94 to discharge liquid into the sewage 92. However, it is to be understood that a conduit may be secured to stretch 26 for conveying the liquid discharged from apparatus 10 to a suitable point of collection as may be deemed required for a particular treatment installation.

As the motor within motor housing 36 is actuated by interconnecting the same with a source of power, shaft 50 is caused to rotate in a clockwise direction when viewing FIG. 3, to thereby cause elements 62 to rotate in the same direction. Elements 62 thereby assume a plurality of configuration as the same rotate about the axis of shaft 50 and the chambers 70 formed by elements 62, are thereby caused to alternately increase and decrease in volume by virtue of the fact that elements 62 engage the inner surface of side wall 14 to a greater or lesser degree.

As elements 62 rotate about the axis of shaft 50, the same create a zone of reduced air pressure in the vicinity of opening 20 to thereby cause the introduction of foam into housing 12 by virtue of the suction action of the reduced air pressure. Since the foam is in the basin 80, the same is drawn away from the latter into stretch 24 and through opening 20 into a chamber 70 aligned with the latter. The foam is then carried toward the opening 22 and simultaneously therewith, the chamber 70 is caused to decrease in volume as opening 22 is approached. As the volume of the corresponding chamber 70 decreases, the foam therewithin is substantially compressed and the compression or collapse of the chamber causes the bubbles presenting the foam to collapse and form a liquid for discharge through opening 22.

It is evident that as the volume of the chambers 70 decrease, the regions formed thereby are pressurized during the time of transit of the effluent from the opening 20 to the opening 22. It is also to be noted that the chambers 70 move the effluent from a first zone adjacent the opening 20 at reduced pressure to a second zone adjacent to opening 22 at increased pressure, during which time the compression of the foam bubbles takes place to thereby eliminate the foam and place the liquid and gas effluent in a position to be drawn off through opening 22.

It is clear that no external pumping device is required to direct the foam from basin 80 toward the opening 20, for the suction action of the reduced pressure due to the rotation of elements 62 about shaft 50, causes sufficient suction to draw the effluent and foam into chambers 70 from area 86. Elements 62 are maintained in substantial engagement with the inner surface of side wall 14 so long as shaft 50 is rotated by virtue of the centrifugal force placed on elements 62 as the same are caused to rotate by shaft 50. It is contemplated that the rotation of shaft 50 will be approximately 1150 r.p.m. to 1750 r.p.m., thereby maintaining a sufficient centrifugal force on elements 62 to assure that the same remain in engagement with side wall 14.

Although it has been indicated that the liquid effluent from the pump unit may be directed either back into the basin 80 or pumped to a suitable collection area, it is also to be pointed out that the discharge conduit from the pump may be extended over into other basins of the sewage treatment equipment such as the clarification basin or a settling basin. In these areas, there is less tendency for the agitating liquid to cause the detergent to again foam and the liquefied detergent is directed out of the sewage plant through the conventional weir arrangement provided at the outlet of the treatment equipment.

Having thus described the invention, what is claimed as new and desired to be secured by Letters Patent is:

1. The method of eliminating foam from the surface of a liquid comprising:
  (I) introducing said foam through an inlet adjacent said liquid surface into a large zone defined by a circular wall and at least two flexible impeller blades in contact therewith, said blades being connected along the entire length thereof to a rotatable shaft located eccentrically of said wall;
  (II) moving and thereby decreasing the size of said zone so as to increase the pressure therein to a value that collapses said foam by rotating said shaft to cause said blades to slide along said wall; and
  (III) dicharging liquid and gas resulting from collapse of said foam through an outlet from said zone.

2. The method of separating a foamable material from a first liquid mixed therewith comprising:
  (I) agitating said first liquid so as to produce foam on the surface thereof;
  (II) introducing said foam through an inlet adjacent said first liquid surface into a large zone defined by a circular wall and at least two flexible impeller blades in contact therewith, said blades being connected along the entire length thereof to a rotatable shaft located eccentrically of said wall;
  (III) moving and thereby decreasing the size of said zone so as to increase the pressure therein to a value that collapses said foam by rotating said shaft to cause said blades to slide along said wall;

(IV) discharging a second liquid and gas resulting from collapse of said foam through an outlet from said zone; and (V) maintaining said second liquid and gas separate from said first liquid.

3. The method of eliminating detergent foam from the surface of sewage comprising:
(I) introducing said detergent foam through an inlet adjacent said sewage surface into a large zone defined by a circular wall and at least two flexible impeller blades in contact therewith, said blades being connected along the entire length thereof to a rotatable shaft located eccentrically of said wall;
(II) moving and thereby decreasing the size of said zone so as to increase the pressure therein to a value that collapses said detergent foam by rotating said shaft to cause said blades to slide along said wall; and
(III) discharging liquid and gas resulting from collapse of said detergent foam through an outlet from said zone.

4. The method of separating detergent from sewage comprising:
(I) agitating said sewage so as to form a detergent foam on the surface thereof;
(II) introducing said detergent foam through an inlet adjacent said sewage surface into a large zone defined by a circular wall and at least two flexible impeller blades in contact therewith, said blades being connected along the entire length thereof to a rotatable shaft located eccentrically of said wall;
(III) moving and thereby decreasing the size of said zone so as to increase the pressure therein to a value that collapses said detergent foam by rotating said shaft to cause said blades to slide along said wall;
(IV) discharging liquid and gas resulting from collapse of said detergent foam through an outlet from said zone, and
(V) maintaining said resulting liquid and gas separate from said sewage.

5. The method of separating detergent from sewage comprising:
(I) confining a quantity of sewage in an open-topped tank;
(II) aerating said sewage so as to form a detergent foam on the surface thereof;
(III) introducing said detergent foam through an inlet adjacent said sewage surface into a large zone defined by a circular wall and a plurality of flexible impeller blades in contact therewith, said blades being connected along the entire length thereof to a rotatable shaft located eccentrically of said wall;
(IV) moving and thereby decreasing the size of said zone so as to increase the pressure therein to a value that collapses said detergent foam by rotating said shaft to cause said blades to slide along said wall;
(V) discharging liquid and gas resulting from collapse of said detergent foam through an outlet from said zone, and
(VI) maintaining said resulting liquid and gas separate from said sewage.

References Cited in the file of this patent
UNITED STATES PATENTS

| | | |
|---|---|---|
| 891,372 | Reichhelm | June 23, 1908 |
| 1,053,321 | Schrock | Feb. 18, 1913 |
| 1,715,036 | Jamouneau | May 28, 1929 |
| 1,811,513 | Mason | June 23, 1931 |
| 1,847,648 | Harkom | Mar. 1, 1932 |
| 1,993,944 | Peebles | Mar. 12, 1935 |
| 2,189,356 | Briggs | Feb. 6, 1940 |
| 2,366,513 | Gates | Jan. 2, 1945 |
| 2,466,440 | Kiekhaefer | Apr. 5, 1949 |
| 2,599,600 | Arnold | June 10, 1952 |
| 2,606,150 | Thorp | Aug. 5, 1952 |
| 2,636,479 | Smyser | Apr. 28, 1953 |
| 2,642,148 | Grice | June 16, 1953 |
| 2,648,287 | Thoren et al. | Aug. 11, 1953 |
| 2,830,859 | Parsons | Apr. 15, 1958 |
| 2,855,853 | Yaugher et al. | Oct. 14, 1958 |
| 2,911,920 | Thompson | Nov. 10, 1959 |
| 2,920,763 | Lind et al. | Jan. 12, 1960 |
| 2,974,767 | Fulton | Mar. 14, 1961 |
| 3,018,843 | Mercier | Jan. 30, 1962 |

FOREIGN PATENTS

| | | |
|---|---|---|
| 432,860 | Italy | Mar. 30, 1948 |
| 534,143 | Belgium | Dec. 31, 1954 |

OTHER REFERENCES

Kristal and Annett: Pumps, New York, McGraw-Hill, pages 155–158, 168–170.

Gurnham: "Principles of Industrial Waste Treatment," New York, John Wiley & Sons, Inc., pp. 72–73.